United States Patent
Hall-Thompson et al.

(10) Patent No.: US 12,044,818 B2
(45) Date of Patent: Jul. 23, 2024

(54) SYSTEM FOR IN SITU ESTIMATION OF SUB-EROSION PRODUCTION RATES IN GAS WELLS

(71) Applicant: Saudi Arabian Oil Company, Dhahran (SA)

(72) Inventors: Bryan Hall-Thompson, Dhahran (SA); Bandar H. Al Malki, Dammam (SA); Haif Al Qahtani, Dammam (SA); Abdulaziz A. Alsuhaimi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 286 days.

(21) Appl. No.: 17/069,668

(22) Filed: Oct. 13, 2020

(65) Prior Publication Data
US 2022/0113446 A1   Apr. 14, 2022

(51) Int. Cl.
*G01V 20/00* (2024.01)
*E21B 47/06* (2012.01)
(Continued)

(52) U.S. Cl.
CPC .............. *G01V 20/00* (2024.01); *E21B 47/06* (2013.01); *E21B 47/07* (2020.05); *G06F 30/20* (2020.01);
(Continued)

(58) Field of Classification Search
CPC ...... G01V 99/005; G01V 20/00; E21B 47/06; E21B 47/07; E21B 2200/20; E21B 43/00; G06F 30/20; G06F 2113/08
See application file for complete search history.

(56) References Cited

U.S. PATENT DOCUMENTS

2013/0008649 A1* 1/2013 Vestbostad .............. E21B 47/08
166/250.05
2016/0312552 A1* 10/2016 Early ................... G05B 13/041

FOREIGN PATENT DOCUMENTS

WO   WO 2016192077   12/2016

OTHER PUBLICATIONS

Terziev et al. "Improved Procedures for Estimating the Erosional Rates in High Offtake Gas Wells: Application of University of Tulsa Flow Loop Derived Correlations." Paper presented at the SPE Asia Pacific Oil and Gas Conference and Exhibition, Perth, Australia, Oct. 2004. doi: https. (Year: 2004).*

(Continued)

*Primary Examiner* — Eunhee Kim
(74) *Attorney, Agent, or Firm* — Fish & Richardson P.C.

(57) ABSTRACT

Systems and methods include a computer-implemented method: Historical and forecasted field life data for existing gas wells is received, including pressure and temperature data at different depths of the existing gas wells over the life of the existing gas wells. Using the historical and forecasted field life data for the existing gas wells, a sub-erosion production rates model is generated for in situ estimation of sub-erosion for gas wells. Well parameters for a subject gas well are received. Using the well parameters of the subject gas well, the sub-erosion production rates model is executed to identify high-erosion risk spots in the subject gas well, including using iteratively evaluating results using three different methods. Outputs of the sub-erosion production rates model are provided for presentation to a user in a graphical user interface (GUI).

20 Claims, 5 Drawing Sheets

(51) Int. Cl.
    *E21B 47/07*     (2012.01)
    *G06F 30/20*     (2020.01)
    *G06F 113/08*     (2020.01)

(52) U.S. Cl.
    CPC ....... *E21B 2200/20* (2020.05); *G06F 2113/08* (2020.01)

(56) References Cited

OTHER PUBLICATIONS

Russell, Ronnie, Nguyen, Hang, and Kai Sun. "Choosing Better API RP 14E C Factors for Practical Oilfield Implementation." Paper presented at the CORROSION 2011, Houston, Texas, Mar. 2011. 17 pages. (Year: 2011).*

Ariana et al. "Beyond the Limitations of API RP-14E Erosional Velocity—A Field Study for Gas Condensate Wells". Phys. Chem. Res., vol. 6, No. 1, 193-207, Mar. 2018. DOI: 10.22036/pcr.2017.93963.1403 (Year: 2018).*

Sahu et al. "Exception-Based Surveillance—Integrating Well Models, Real Time Production Estimates and Hydrocarbon Accounting Tool in Well Operating Envelopes to Ensure Optimal Well Production within Safe Limits.". Dec. 2014. Paper No. IPTC-17981-MS. (Year: 2014).*

Wee, Thierry, et al. "Value of Portable High Frequency Multiphase Flow Meter Testing for Brownfield Well Production Optimisation and Maximising Reservoir Performance—A Case Study of an Offshore Brownfield in Peninsular Malaysia." SPE Symposium. OnePetro, 2017. 13 Pages. (Year: 2017).*

Salama et al., "An Alternative to API 14E Erosional Velocity Limits for Sand Laden Fluid, " Journal of Energy Resources Technology, Jun. 2000, 7 pages.

Terziev et al., "Improved Procedures for Estimating Erosional Rates in High Offtake Gas Wells—Tulsa Derived Correlations," SPE-88492-MS, SPE Asia Pacific Oil and Gas Conference, Perth, Australia, Oct. 18-20, 2004, 10 pages.

DNV, "Recommended practice RP 0501 erosive wear in piping systems," Jan. 2011, 43 pages.

Healy et al., "Erosion study for a 400 MMcf/d completion: cannonball field, Offshore Trinidad, " SPE 115546, Sep. 2008, Society of Petroleum Engineers, 16 pages.

Parsi et al., "A comprehensive review of solid particle erosion modeling for oil and gas wells and pipelines applications," Journal of Natural Gas Science and Engineering, Oct. 2014, 21:850-875, 24 pages.

Procyk et al., "Sand control screen erosion: prediction and avoidance," SPE-174837, Sep. 2015, Society of Petroleum Engineers, 26 pages.

Wang et al., "Advanced modeling of well tubulars erosion by solids including multiphase effects," Society of Petroleum Engineers, Nov. 2015, 16 pages.

PCT International Search Report and Written Opinion in International Appln. No. PCT/US2021/054384, dated Feb. 3, 2022, 16 pages.

* cited by examiner

SYSTEM FOR IN SITU ESTIMATION OF SUB-EROSION PRODUCTION RATES IN GAS WELLS

BACKGROUND

The present disclosure applies to estimating erosion and sub-erosion rates in gas wells. The erosion rate is the gas rate at which actual material erosion occurs. The sub-erosion rate is the maximum gas rate a well can produce without experiencing erosion.

Standard industry practices for estimating erosion and sub-erosion rates in gas wells typically include single-step approaches. For example, a single-step approach can be based on one or more American Petroleum Institute (API) 14E standards, empirical equations, or advanced numerical models. These techniques can provide a fixed estimate of sub-erosion rates at user-defined nodes for the production life of the assets. However, API recommended practice (RP) 14E protocols for computing sub-erosion rates are generally conservative, with data origins that are typically obtained from surface piping and not downhole piping systems. Such methodologies are not suited for the high-pressure, high-temperature wells designed with specialty alloys because the methodologies tend to under-estimate sub-erosion rates. Techniques that include the evaluation of gas wells and the quantification and development of an operating map for the life of a well can require weeks of development time.

SUMMARY

The present disclosure describes techniques that can be used for estimating erosion rates in gas wells. For example, proprietary techniques used to estimate well sub-erosion rates for gas wells can be completed using proprietary materials such as high-grade duplex alloys and wellbore configurations used for offshore gas wells. In some implementations, a computer-implemented method includes the following. Historical and forecasted field life data for existing gas wells is received, including pressure and temperature data at different depths of the existing gas wells over the life of the existing gas wells. Using the historical and forecasted field life data for the existing gas wells, a sub-erosion production rates model is generated for in situ estimation of sub-erosion for gas wells. Well parameters for a subject gas well are received. Using the well parameters of the subject gas well, the sub-erosion production rates model is executed to identify high-erosion risk spots in the subject gas well, including using iteratively evaluating results using three different methods. Outputs of the sub-erosion production rates model are provided for presentation to a user in a graphical user interface (GUI).

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, techniques of the present disclosure can provide a more detailed analysis than be accomplished by conventional techniques. This is in part because the entire well architecture is evaluated, allowing the automatic identification of the most risky points for assessment, as opposed to limited, user-selected, fixed depths. Second, the techniques can be more robust than conventional techniques, since analysis is performed using three different methods at each depth, and the results are compared. Third, tools can use allowed material loss (AML) data, compute tolerable limits of erosion, analyze the well data, and output results to a user. Fourth, the techniques can iteratively evaluate results and provide advice on high-erosion risk spots. Fifth, a real wellbore model is parameterized, accounting for an entire well architecture, flow regimes, and rates. Sixth, the techniques can be used in situations that include: 1) service companies that manufacture and sell high-grade material wellbore tubulars, 2) gas production companies that need to maximize the rate of production, and 3) organizations interested in performing large-scale wellbore erosion analysis.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for estimating erosion and sub-erosion rates in gas wells. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques of the present disclosure can be used to create and parameterize well models to forecast wellbore material erosion and recommend sub-erosion gas production rates across the technical and economic life span of a gas well. The processes involved are comprehensive, providing high-fidelity sub-erosion gas rates determined for multiple nodes and depth levels and automatically selecting high-risk erosion nodes. Tools that are used can adapt to changing field conditions and dynamically compute these rates with iterations across the entire wellbore architecture, operating conditions, and specific material metallurgy. The tools can also account for solids rates. The results of these techniques include providing users with a safe operating envelope and can reduce or eliminate the cost of workovers due to erosion-related issues.

A method and software code can be used to create and parameterize wellbore models. An integrated workflow can be established to determine material erosion based on available material and metallurgy information and user-entered operation conditions. Software code can be developed to determine in situ erosion conditions, parameterize in situ geometries, solve three analytical methods of erosion estimation, and select suitable sub-erosion rates.

The techniques can include methods and software that is developed to forecast sub-erosion rates to ensure safe production for the life of gas wells. Erosion forecasting in gas wells is typically rare in conventional settings. If forecasting is done at all, the forecasting is commonly performed using empirical methods such as the API RP14E or analytical equations that predict sub-erosion gas rates at a single time step, after which the value is assumed for the rest of a project's life. In implementing such erosion analysis, a fixed depth is selected alongside an expected geometry and assumed flow conditions, solids content, and fluid characteristics. This approach can estimate expected erosion velocity and a rate of erosion that must not be exceeded during the well production. Advanced numerical and computational fluid dynamics (CFD) methods exist, but due to computational limits, these techniques are performed for specific equipment with no clear structure for identification of erosion risk spots. Also, CFD methods typically infer a single sub-erosion rate. The current claim estimates sub-erosion rates that are time dependent in relation to the pressure depletion observed in subsurface reservoirs.

Prior to estimating sub-erosion rates using existing methods, a tolerable limit of erosion (TLR) for the gas well is determined. The TLR for the gas well can be represented in millimeters per year (mm/yr), or simply mils per year (mpy) that is one-$1,000^{th}$ of an inch per year. The TLR that is determined may be compared to an industry standard, such as 4 mpy. The determination can be based on erosion velocity limits established using testing and based on literature (and in some cases mechanical assessments) to establish material loss limits advised by material vendors or calculated using commercial wellbore packages.

Integrated software systems and tools for use on a computer can use a commercially-available programming language. A well model can be parameterized using actual completion specifications of gas wells and associated fluid properties. The parameterized well model can perform a detailed forecast of the well production rates across user-selected subsurface and surface pressures and temperatures. During each prediction step, the gas well performance can be split into nodes. The software can iterate through all nodes to identify nodes with highest risks of erosion. The tool can automatically report the node(s) with the highest risk to the user.

The programmed tool includes application logic to iterate across all depths in order to select an erosion risk depth or node based on criteria set by the user. For the selected node or depth, data corresponding to the flow behavior, material geometry, and fluid composition (or gas specific properties) are reported back to the user. A solids rate can be input by the user, and quantities can be dynamically calculated at each step.

After the tool executes, information can be presented to the user. The user validates results for any change or allows the tool to automatically enter preferred results and compute multi erosion rates using any existing analytical equations from industry. These erosion rates are computed for every surface and subsurface parameter entered by the user.

The tool can allow users to be presented with high-fidelity data that is based on a broad combination of user-entered parameters, providing an improvement over single point calculations available in typical conventional systems. In some implementations, the tool can currently process around 10,000 combinations specified by the user. For each analytical method selected by the user, the tool can output all user-required computations and can automatically identify gas production rates for the duration of the field life, while honoring the operating conditions set by the user. As an example, the tool can use derived erosion velocity data to advise the user on the expected operating erosion velocity for a subject (or target) gas well. Also, the tool can be used to advise the user regarding an operating c-factor, for use as an input based on an API RP 14E assessment. The API RP 14E c-factor is a mathematical integer constant recommended by the API to account for material type, impurities and flow conditions in piping systems. This c-factor, when divided by the square root of the gas density, will estimate an erosional velocity in feet/second (ft/sec) for a specific condition. The erosional velocity is the maximum velocity that can be achieved by a fluid type without causing erosion.

In another example, the tool can compute tolerable erosion rates or sub-erosion rates. For example, the tool can iterate through all computed gas production rates that do not exceed the erosion limit designed for wellbores similar to the wellbore for which the tool is used.

The sub-erosion tool can serve as a user-driven system that allows more proprietary data to be entered by the user (as compared to conventional systems) and can estimate sub-erosion rates for gas wells. The tool can perform multiple point calculations (as opposed to single point calculations) to determine the sub-erosion rate for a well. The multiple calculations can be combined with user-defined erosion calculation or analytical calculations available in conventional systems. Using the tool can avoid the need for a current API RP 14E system estimate and, if required or requested by the user, can recommend a suitable c-factor to be used for an API RP 14E system. This tool can operate on a standalone basis or can be connected to commercial well nodal analysis software.

Figure 1:
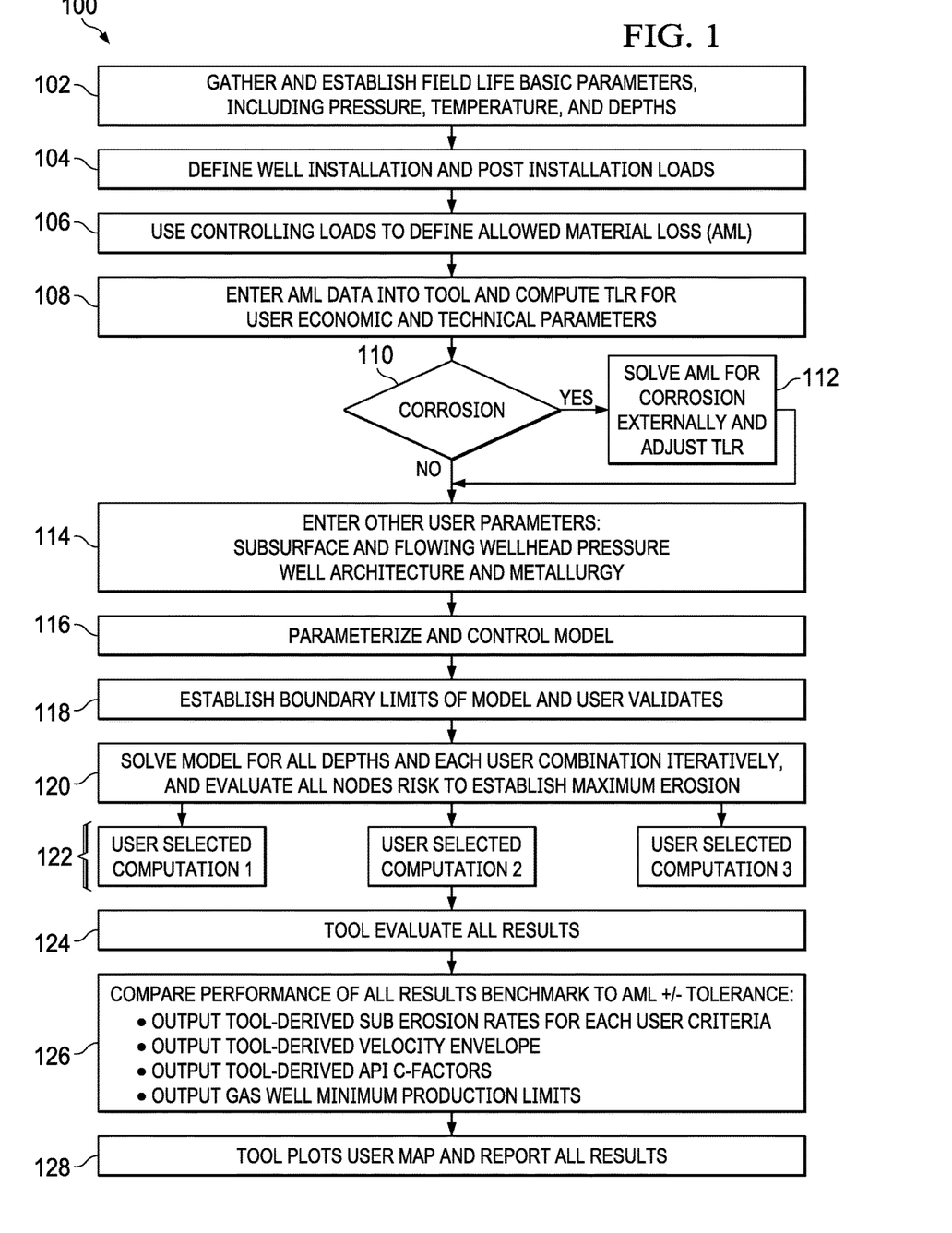
FIG. 1 is a flow diagram of an example of a workflow 100 for estimating erosion rates in gas wells, according to some implementations of the present disclosure.

FIG. 1 is a flow diagram of an example of a workflow 100 for estimating erosion rates in gas wells, according to some implementations of the present disclosure.

At 102, field life basic parameters are gathered and established. The parameters can include the operating pressures, temperature, average depths and gas quality relative to air. The compositions and liquid content is specified at this time. Other information provided includes the operating periods that are referred to as the early, middle, and late economic life of the gas well.

At 104, well installation and post installation loads are defined. As an example, a user can enter the information into a computer, such as using a graphical user interface (GUI) that serves as a front-end of the tool. In some implementations, the user-defined installation loads can be used with third-party applications such as WELLCAT™ or similar casing design applications to simulate the load performance of the well and to identify stresses that can cause mechanical failures of the materials At 106, controlling loads are used to define allowed material loss (AML). The AML, in percentages (%), defines the maximum extent of material wear allowed on the walls of the gas well tubing production conduit.

At 108, AML data is entered into the tool, and tolerable loss rate (TLR) is computed for user economic and technical parameters. The TLR, in mils per year (mpy), is defined as the rate of loss the user accepts to tolerate. It is a ratio of the AML to the total duration of the user economic or well intervention limit in years.

At 110, a determination is made whether corrosion exceeds a predetermined threshold, for example, TLR.

At 112, AML for corrosion is solved externally to the tool, and TLR is adjusted as a sum of TLR due to corrosion and TLR due to erosion. AML solved at 112 is less than AML at 106

At 114, other user parameters are entered, including subsurface pressure at different time in the life of a well and flowing wellhead pressure. The well architecture and metallurgy is also entered at this time.

At 116, a well model is created using a computer program or third-party well modelling software, parameterized, and controlled.

At 118, boundary limits of model are established, and the user validates the boundary limits such as a maximum user production rate or pressure.

At 120, the model is solved (or executed) for all depths and for each user-entered combination of inputs. Examples of user inputs include facilities and subsurface pressure. Each and all of the nodes' risk is iteratively evaluated to establish a likely point of maximum erosion.

At 122, computations are selected by the user. These computations can include a comparison of empirical and analytical models such as the API 14E or similar single-point erosion models. The user can also make adjustments, as needed.

At 124, results are evaluated by the tool, including performing an analysis using three different methods as selected in 122 at each depth and comparing the results.

At 126, the performance of all results are compared to AML-TLR limits+/−tolerance benchmarks. The tool provides outputs, including: tool-derived sub-erosion rates for each combination of user-entered criteria, a tool-derived erosion velocity envelope, tool-derived API c-factors, and tool-derived gas well minimum production limits.

At 128, a user map is plotted by the tool, and all results are reported by the tool. For example, the GUI and can present the user map and the results to the user. Such results can include a table of user-entered pressures, calculated sub-erosion rates, and recommended operating ranges of velocities with high-risk node reported post an iterative selection from the entire well depth.

Figure 2A:
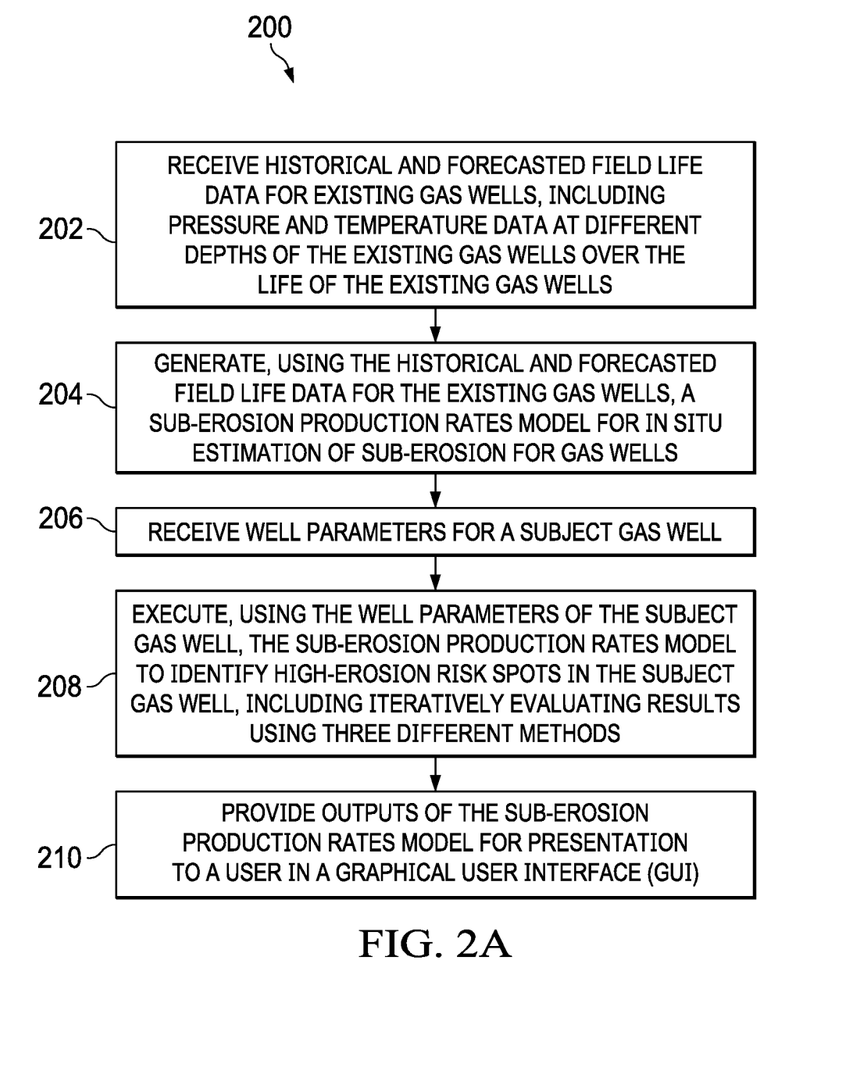
FIG. 2A is a flowchart of an example of a method for generating and executing a sub-erosion production rates model to identify high-erosion risk spots for a subject gas well, according to some implementations of the present disclosure.

FIG. 2A is a flowchart of an example of a method 200 for generating and executing a sub-erosion production rates model to identify high-erosion risk spots for a subject gas well, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, historical and forecasted field life data for existing gas wells is received. The historical field life data can include, for example, pressure and temperature data at different depths of the existing gas wells over the life of the existing gas wells. This also includes the composition of the gas fluid, the density of the gas fluid, the proportion of liquids in the gas fluids, the solids content that is mass of solids per unit of gas rates, and the size if the solids in microns. From 202, method 200 proceeds to 204.

At 204, using the historical and forecasted field life data for the existing gas wells, a well model is created by parametrization using standard software such as Microsoft Excel or industry wellbore hydraulic model tools such as Prosper. The parameterized model segments the well into specific smaller well lengths specified by the user or automatically if a hydraulic well modelling tool is used. From 204, method 200 proceeds to 206.

At 206, well parameters for a subject gas well are received (for example, from a user through a GUI). As an example, the well parameters can include: tubing diameters, subsurface and flowing wellhead pressure, solids rate, solids particle sizes, particle densities, AML, and well architecture such as bending angles. TLR is computed at this point using imputed data. Additional input for the tool is the TLR due to corrosion. From 206, method 200 proceeds to 208.

At 208, using the well parameters of the subject gas well, the sub-erosion production rates model is executed to identify high-erosion risk spots in the subject gas well, including using iteratively evaluating results using three different methods. The parameterized model is solved to obtain total gas rates for different user combinations of subsurface pressure and facilities operating pressure. For each gas rate obtained, corresponding values of velocities across each segmented depth are obtained alongside an iteration across all depths to obtain the depth of maximum velocity that is indicative of the maximum point of high-rate erosion. Corresponding in situ mixture and gas densities at the risk depth is also output to the user. All user outputs are utilized with at least 3 different models including the API RP 14E for comparative purposes to compute erosion rates for the different user combinations of subsurface and facilities pressures. The sub-erosion gas rates are obtained by comparing gas rates for each user combination as obtained from each model used. Gas rates that permit erosion below the threshold defined by the TLR are selected as allowable gas rates for each well type. The maximum of the allowable rates is sub-erosion gas rate for each user-defined method. In some implementations, boundary limits of the sub-erosion production rates model are generated and presented in the GUI. User validation of the boundary limits are received and applied to the sub-erosion production rates model before execution of the sub-erosion production rates model. From 208, method 200 proceeds to 210.

Figure 2B:
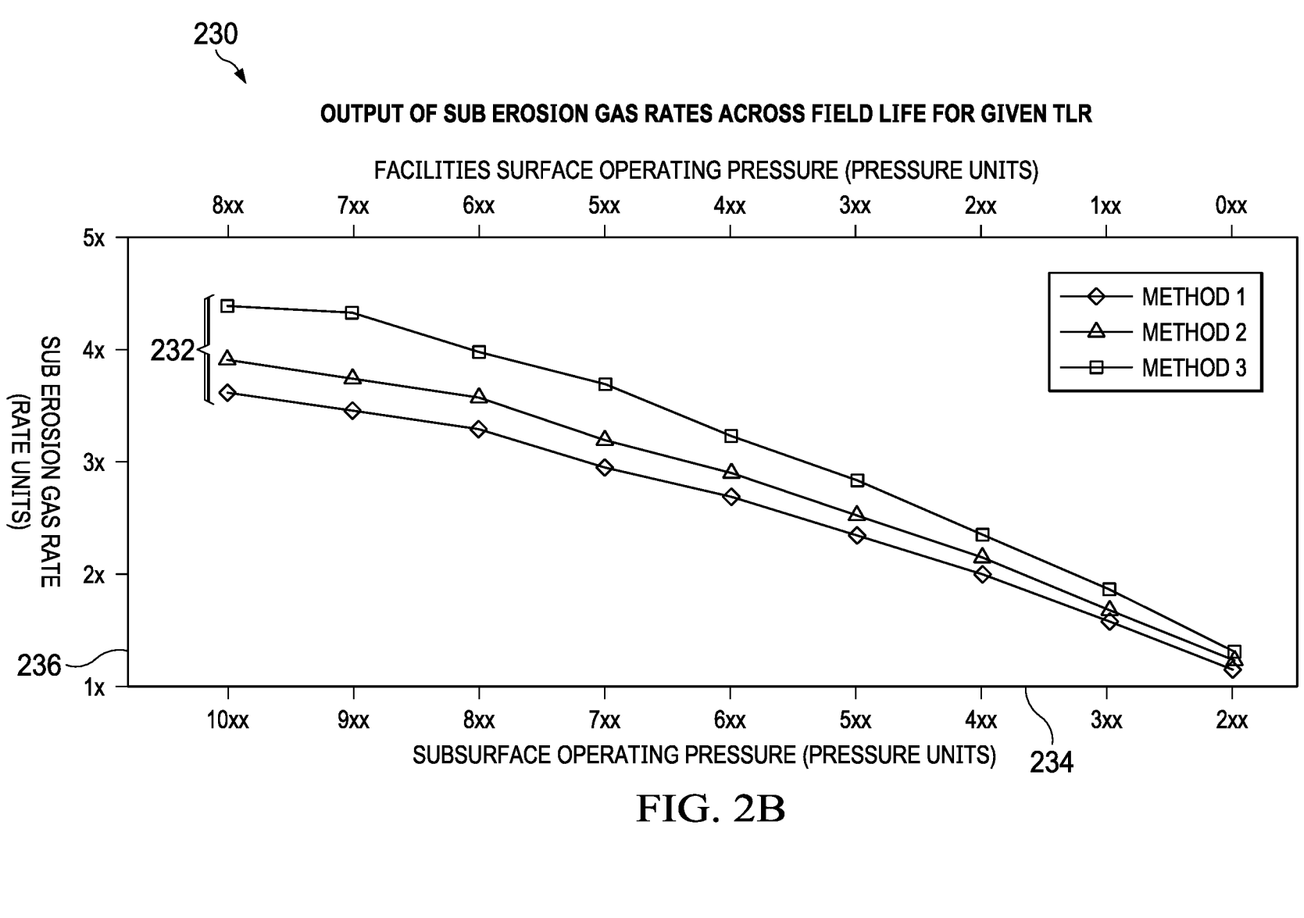
FIG. 2B is a plot showing example sub-erosion gas rates based on different user inputs and methods, according to some implementations of the present disclosure.
Figure 2C:
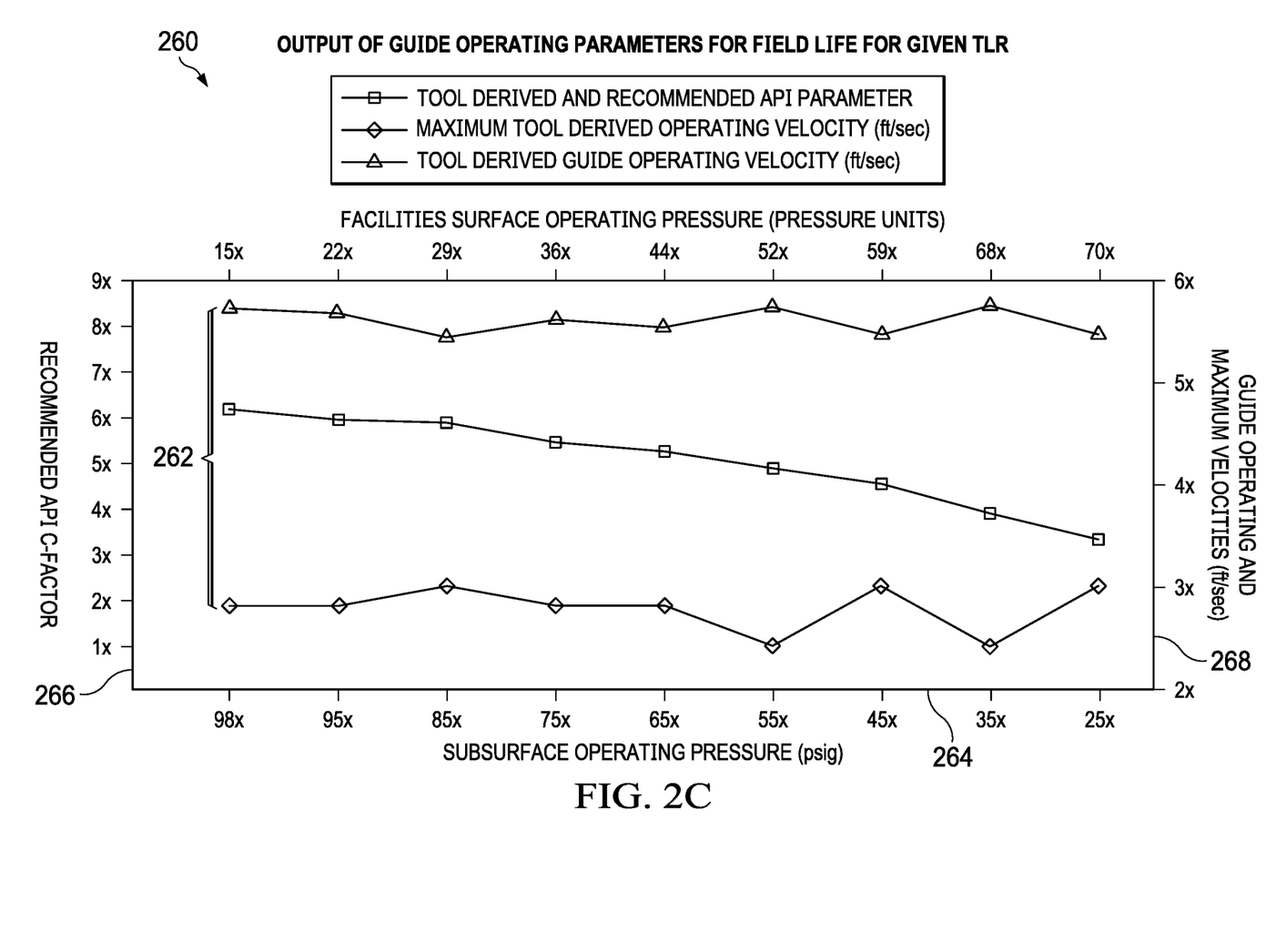
FIG. 2C is a plot showing example guide operating parameters for the field life for a given tolerable limit of erosion (TLR), according to some implementations of the present disclosure.

At 210, outputs of the sub-erosion production rates model are provided for presentation to a user in a GUI. For example, the outputs include: tool-derived sub-erosion rates for each combination of user-entered criteria, a tool-derived erosion velocity envelope, tool-derived API C-factors, and tool-derived gas well minimum production limits. After 210, method 200 can stop. Example of outputs from step 210 are shown in plots 230 and 260.

FIG. 2B is a plot 230 showing example Sub-erosion gas rates based on different user inputs and methods, according to some implementations of the present disclosure. For example, the plot 230 shows an output of sub-erosion gas rates across the field life for a given TLR. The plot 230 includes plots 232 plotted relative to a subsurface operating pressure (PSIG) 234 and a sub-erosion gas rate 236 (for example, in MMSCFD).

FIG. 2C is a plot 260 showing example guide operating parameters for the field life for a given TLR, according to some implementations of the present disclosure. For example, the plot 260 includes plots 262 plotted relative to a subsurface operating pressure (PSIG) 264, a recommended API C-factor 266, and guide operating and maximum velocities 268 (ft/sec).

Figure 3:
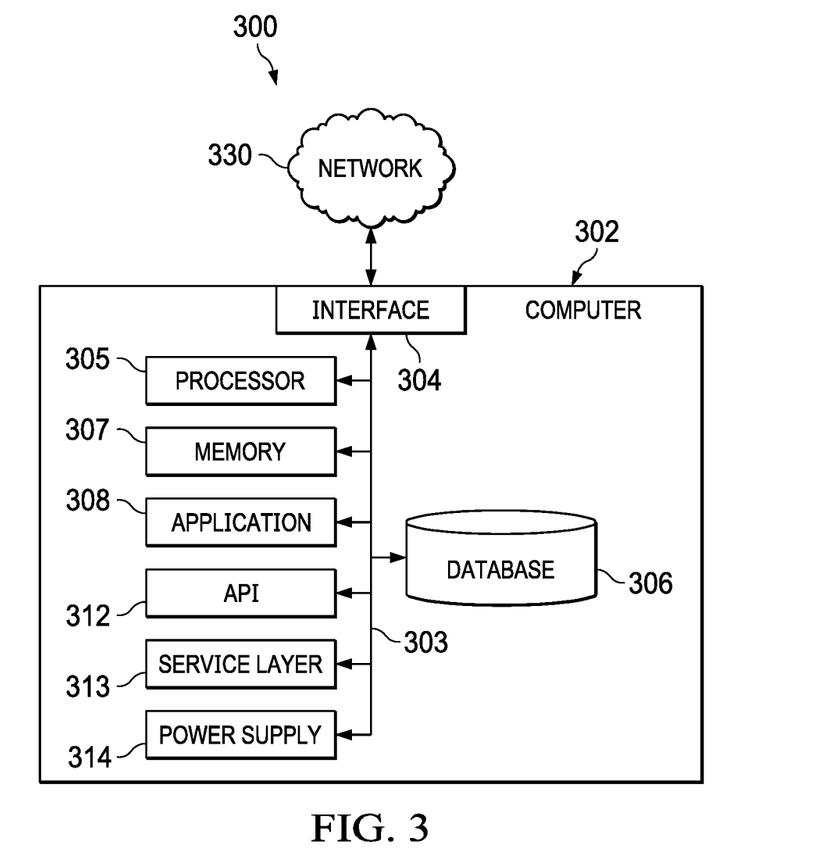
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI). The physical location of the computer can be on the wellhead at the well site that allows for implementation in real time at the producing gas well.

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power-supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. Historical and forecasted field life data for existing gas wells is received, including pressure and temperature data at different depths of the existing gas wells over the life of the existing gas wells. Using the historical and forecasted field life data for the existing gas wells, a sub-erosion production rates model is generated for in situ estimation of sub-erosion for gas wells. Well parameters for a subject gas well are received. Using the well parameters of the subject gas well, the sub-erosion production rates model is executed to identify high-erosion risk spots in the subject gas well, including using iteratively evaluating results using three different methods. Outputs of the sub-erosion production rates model are provided for presentation to a user in a graphical user interface (GUI).

The foregoing and other described implementations can each, optionally, include one or more of the following features:

A first feature, combinable with any of the following features, where the outputs include: tool-derived sub-erosion rates for each combination of user-entered criteria, a tool-derived erosion velocity envelope, tool-derived American Petroleum Institute (API) C-factors, and tool-derived gas well minimum production limits.

A second feature, combinable with any of the previous or following features, where the well parameters include: controlling loads, including well installation and post installation loads; subsurface and flowing wellhead pressure; and well architecture and metallurgy.

A third feature, combinable with any of the previous or following features, where the method further includes determining, using the controlling loads, an allowed material loss (AML) for the subject gas well.

A fourth feature, combinable with any of the previous or following features, where the method further includes determining, using the AML for the subject gas well, whether corrosion estimates for the subject gas well exceed a predetermined threshold.

A fifth feature, combinable with any of the previous or following features, where the method further includes: generating boundary limits of sub-erosion production rates model; presenting the boundary limits in the GUI; receiving user validation of the boundary limits; and applying the boundary limits to the sub-erosion production rates model before execution of the sub-erosion production rates model.

A sixth feature, combinable with any of the previous or following features, where receiving the well parameters for the subject gas well includes receiving the well parameters from a user using the GUI.

In a second implementation, a computer-implemented system includes: a sub-erosion production rates model for in situ estimation of sub-erosion for gas wells; a graphical user interface (GUI) for presenting outputs of the sub-erosion production rates model to a user; one or more processors; and a non-transitory computer-readable storage medium coupled to the one or more processors and storing programming instructions for execution by the one or more processors, the programming instructions instructing the one or more processors to perform operations. The operations include: receiving historical field life data for existing gas wells, including pressure and temperature data at different depths of the existing gas wells over the life of the existing gas wells; generating, using the historical field life data for the existing gas wells, the sub-erosion production rates model; receiving well parameters for a subject gas well; executing, using the well parameters of the subject gas well, the sub-erosion production rates model to identify high-erosion risk spots in the subject gas well, including using iteratively evaluating results using three different methods; and providing outputs of the sub-erosion production rates model for presentation to the GUI.

The foregoing and other described implementations can each, optionally, include one or more of the following features:

A first feature, combinable with any of the following features, where the outputs include: tool-derived sub-erosion rates for each combination of user-entered criteria, a tool-derived erosion velocity envelope, tool-derived American Petroleum Institute (API) C-factors, and tool-derived gas well minimum production limits.

A second feature, combinable with any of the previous or following features, where the well parameters include: controlling loads, including well installation and post installation loads; subsurface and flowing wellhead pressure; and well architecture and metallurgy.

A third feature, combinable with any of the previous or following features, where the operations further include determining, using the controlling loads, an allowed material loss (AML) for the subject gas well.

A fourth feature, combinable with any of the previous or following features, where the operations further include determining, using the AML for the subject gas well, whether corrosion estimates for the subject gas well exceed a predetermined threshold.

A fifth feature, combinable with any of the previous or following features, where the operations further include: generating boundary limits of sub-erosion production rates model; presenting the boundary limits in the GUI; receiving user validation of the boundary limits; and applying the boundary limits to the sub-erosion production rates model before execution of the sub-erosion production rates model.

A sixth feature, combinable with any of the previous or following features, where receiving the well parameters for the subject gas well includes receiving the well parameters from a user using the GUI.

In a third implementation, a non-transitory, computer-readable medium stores one or more instructions executable by a computer system to perform operations including the following. Historical and forecasted field life data for existing gas wells is received, including pressure and temperature data at different depths of the existing gas wells over the life of the existing gas wells. Using the historical and forecasted field life data for the existing gas wells, a sub-erosion production rates model is generated for in situ estimation of sub-erosion for gas wells. Well parameters for a subject gas well are received. Using the well parameters of the subject gas well, the sub-erosion production rates model is executed to identify high-erosion risk spots in the subject gas well, including using iteratively evaluating results using three different methods. Outputs of the sub-erosion production rates model are provided for presentation to a user in a graphical user interface (GUI).

The foregoing and other described implementations can each, optionally, include one or more of the following features:

A first feature, combinable with any of the following features, where the outputs include: tool-derived sub-erosion rates for each combination of user-entered criteria, a tool-derived erosion velocity envelope, tool-derived American Petroleum Institute (API) C-factors, and tool-derived gas well minimum production limits.

A second feature, combinable with any of the previous or following features, where the well parameters include: controlling loads, including well installation and post installation loads; subsurface and flowing wellhead pressure; and well architecture and metallurgy.

A third feature, combinable with any of the previous or following features, where the operations further include determining, using the controlling loads, an allowed material loss (AML) for the subject gas well.

A fourth feature, combinable with any of the previous or following features, where the operations further include determining, using the AML for the subject gas well, whether corrosion estimates for the subject gas well exceed a predetermined threshold.

A fifth feature, combinable with any of the previous or following features, where the operations further include: generating boundary limits of sub-erosion production rates model; presenting the boundary limits in the GUI; receiving user validation of the boundary limits; and applying the boundary limits to the sub-erosion production rates model before execution of the sub-erosion production rates model.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving historical and forecasted field life data for existing gas wells, comprising pressure and temperature data at different depths of the existing gas wells over life of the existing gas wells;
generating, using the historical and forecasted field life data for the existing gas wells, a sub-erosion production rates model configured to provide in situ estimations of sub-erosion for gas wells, wherein the estimations comprise estimates of sub-erosion rates that are time dependent in relation to pressure depletion observed in subsurface reservoirs;
receiving, from a hydraulic well modelling tool, well parameters for a subject gas well, the well parameters being automatically determined by the hydraulic well modelling tool;
receiving user-entered criteria for determining sub-erosion rates;
executing, using the well parameters of the subject gas well and the user-entered criteria for determining sub-erosion rates, the sub-erosion production rates model to_identify-erosion risk spots in the subject gas well;
generating, by processing the well parameters of the subject gas well using three different analytical methods of erosion estimation executing single-point erosion models, single-point erosion estimation results;
comparing the erosion risk spots to the single-point erosion estimation results, to generate a comparison result comprising benchmarks of an allowed material loss and a tolerable limit of erosion;
providing the comparison result for presentation to a user in a graphical user interface (GUI);
receiving, in response to providing the comparison result, user adjustments to the user-entered criteria;
iteratively re-executing, to evaluate erosion risk spots at different depths and to identify a likely point of maximum erosion;
providing, to a controller of the subject gas well, using at least the erosion risk spots at different depths and a likely point of maximum erosion, an instruction for operating the subject gas well using sub-erosion production rates.

2. The computer-implemented method of claim 1, wherein executing the sub-erosion production rates model comprises generating: sub-erosion rates determined for each combination of the user-entered criteria, a tool-derived erosion velocity envelope, tool-derived American Petroleum Institute (API) C-factors, and tool-derived gas well minimum production limits.

3. The computer-implemented method of claim 1, wherein the well parameters comprise: controlling loads, including well installation and post installation loads; subsurface and flowing wellhead pressure; and well architecture and metallurgy.

4. The computer-implemented method of claim 3, further comprising determining, using the controlling loads, an allowed material loss (AML) for the subject gas well.

5. The computer-implemented method of claim 4, further comprising determining, using the AML for the subject gas well, whether corrosion estimates for the subject gas well exceed a predetermined threshold.

6. The computer-implemented method of claim 1, further comprising:
   generating boundary limits of the sub-erosion production rates model;
   presenting the boundary limits in the GUI;
   receiving user validation of the boundary limits; and
   applying the boundary limits to the sub-erosion production rates model before execution of the sub-erosion production rates model.

7. The computer-implemented method of claim 1, wherein receiving the well parameters for the subject gas well comprises receiving the well parameters from a user using the GUI.

8. A computer-implemented system, comprising:
   a sub-erosion production rates model configured to provide in situ estimations of sub-erosion for gas wells;
   a graphical user interface (GUI) for presenting outputs of the sub-erosion production rates model to a user;
   one or more processors; and
   a non-transitory computer-readable storage medium coupled to the one or more processors and storing programming instructions for execution by the one or more processors, the programming instructions instructing the one or more processors to perform operations comprising:
   receiving historical and forecasted field life data for existing gas wells, comprising pressure and temperature data at different depths of the existing gas wells over life of the existing gas wells;
   generating, using the historical and forecasted field life data for the existing gas wells, a sub-erosion production rates model configured to provide in situ estimations of sub-erosion for gas wells, wherein the estimations comprise estimates of sub-erosion rates that are time dependent in relation to pressure depletion observed in subsurface reservoirs;
   receiving, from a hydraulic well modelling tool, well parameters for a subject gas well, the well parameters being automatically determined by the hydraulic well modelling tool;
   receiving user-entered criteria for determining sub-erosion rates;
   executing, using the well parameters of the subject gas well and the user-entered criteria for determining sub-erosion rates, the sub-erosion production rates model to_identify -erosion risk spots in the subject gas well;
   generating, by processing the well parameters of the subject gas well using three different analytical methods of erosion estimation executing single-point erosion models, single-point erosion estimation results;
   comparing the erosion risk spots to the single-point erosion estimation results, to generate a comparison result comprising benchmarks of an allowed material loss and a tolerable limit of erosion;
   providing the comparison result for presentation to a user in a graphical user interface (GUI);
   receiving, in response to providing the comparison result, user adjustments to the user-entered criteria;
   iteratively re-executing, to evaluate erosion risk spots at different depths and to identify a likely point of maximum erosion;
   providing, to a controller of the subject gas well, using at least the erosion risk spots at different depths and a likely point of maximum erosion, an instruction for operating the subject gas well using sub-erosion production rates.

9. The computer-implemented system of claim 8, wherein executing the sub-erosion production rates model comprises generating: sub-erosion rates determined for each combination of the user-entered criteria, a tool-derived erosion velocity envelope, tool-derived American Petroleum Institute (API) C-factors, and tool-derived gas well minimum production limits.

10. The computer-implemented system of claim 8, wherein the well parameters comprise: controlling loads, including well installation and post installation loads; subsurface and flowing wellhead pressure; and well architecture and metallurgy.

11. The computer-implemented system of claim 10, the operations further comprising determining, using the controlling loads, an allowed material loss (AML) for the subject gas well.

12. The computer-implemented system of claim 11, the operations further comprising determining, using the AML for the subject gas well, whether corrosion estimates for the subject gas well exceed a predetermined threshold.

13. The computer-implemented system of claim 8, the operations further comprising:
   generating boundary limits of the sub-erosion production rates model;
   presenting the boundary limits in the GUI;
   receiving user validation of the boundary limits; and
   applying the boundary limits to the sub-erosion production rates model before execution of the sub-erosion production rates model.

14. The computer-implemented system of claim 8, wherein receiving the well parameters for the subject gas well receiving the well parameters from a user using the GUI.

15. A non-transitory, computer-readable medium storing one or more instructions executable by a computer system to perform operations comprising:
   receiving historical and forecasted field life data for existing gas wells, comprising pressure and temperature data at different depths of the existing gas wells over life of the existing gas wells;
   generating, using the historical and forecasted field life data for the existing gas wells, a sub-erosion production rates model configured to provide in situ estimations of sub-erosion for gas wells, wherein the estimations comprise estimates of sub-erosion rates that are time dependent in relation to pressure depletion observed in subsurface reservoirs;
   receiving, from a hydraulic well modelling tool, well parameters for a subject gas well, the well parameters being automatically determined by the hydraulic well modelling tool;
   receiving user-entered criteria for determining sub-erosion rates;
   executing, using the well parameters of the subject gas well and the user-entered criteria for determining sub-erosion rates, the sub-erosion production rates model to_identify -erosion risk spots in the subject gas well;
   generating, by processing the well parameters of the subject gas well using three different analytical methods of erosion estimation executing single-point erosion models, single-point erosion estimation results;
   comparing the erosion risk spots to the single-point erosion estimation results, to generate a comparison result comprising benchmarks of an allowed material loss and a tolerable limit of erosion;
   providing the comparison result for presentation to a user in a graphical user interface (GUI);

receiving, in response to providing the comparison result, user adjustments to the user-entered criteria;

iteratively re-executing, to evaluate erosion risk spots at different depths and to identify a likely point of maximum erosion;

providing, to a controller of the subject gas well, using at least the erosion risk spots at different depths and a likely point of maximum erosion, an instruction for operating the subject gas well using sub-erosion production rates.

16. The non-transitory, computer-readable medium of claim 15, wherein executing the sub-erosion production rates model comprises generating: sub-erosion rates determined for each combination of the user-entered criteria, a tool-derived erosion velocity envelope, tool-derived American Petroleum Institute (API) C-factors, and tool-derived gas well minimum production limits.

17. The non-transitory, computer-readable medium of claim 15, wherein the well parameters comprise: controlling loads, including well installation and post installation loads; subsurface and flowing wellhead pressure; and well architecture and metallurgy.

18. The non-transitory, computer-readable medium of claim 17, the operations further comprising determining, using the controlling loads, an allowed material loss (AML) for the subject gas well.

19. The non-transitory, computer-readable medium of claim 18, the operations further comprising determining, using the AML for the subject gas well, whether corrosion estimates for the subject gas well exceed a predetermined threshold.

20. The non-transitory, computer-readable medium of claim 15, the operations further comprising:

generating boundary limits of the sub-erosion production rates model;

presenting the boundary limits in the GUI;

receiving user validation of the boundary limits; and applying the boundary limits to the sub-erosion production rates model before execution of the sub-erosion production rates model.

* * * * *

UNITED STATES PATENT AND TRADEMARK OFFICE
CERTIFICATE OF CORRECTION

PATENT NO. : 12,044,818 B2  
APPLICATION NO. : 17/069668  
DATED : July 23, 2024  
INVENTOR(S) : Bryan Hall-Thompson et al.

Page 1 of 1

It is certified that error appears in the above-identified patent and that said Letters Patent is hereby corrected as shown below:

In the Claims

Column 16, Line 28, Claim 1, please replace "to_identify-erosion" with -- to identify-erosion --.

Column 17, Line 47, Claim 8, please replace "to_identify -erosion" with -- to identify-erosion --.

Column 18, Line 32, Claim 14, please replace "well receiving" with -- well comprises receiving --.

Column 18, Line 57, Claim 15, please replace "to_identify -erosion" with -- to identify-erosion --.

Signed and Sealed this  
Tenth Day of September, 2024

Katherine Kelly Vidal  
*Director of the United States Patent and Trademark Office*